US011727152B2

(12) United States Patent
Springer et al.

(10) Patent No.: US 11,727,152 B2
(45) Date of Patent: Aug. 15, 2023

(54) INTELLIGENT DETECTION OF SENSITIVE DATA WITHIN A COMMUNICATION PLATFORM

(71) Applicant: Zoom Video Communications, Inc., San Jose, CA (US)

(72) Inventors: Shane Springer, Manchester, MI (US); Thomas Noble, Murfreesboro, TN (US)

(73) Assignee: Zoom Video Communications, Inc., San Jose, CA (US)

( * ) Notice: Subject to any disclaimer, the term of this patent is extended or adjusted under 35 U.S.C. 154(b) by 105 days.

(21) Appl. No.: 17/163,445

(22) Filed: Jan. 30, 2021

(65) Prior Publication Data

US 2022/0245283 A1 Aug. 4, 2022

(51) Int. Cl.
G06F 21/62 (2013.01)
G06F 21/84 (2013.01)
H04L 67/12 (2022.01)
G06F 18/214 (2023.01)
G06V 30/262 (2022.01)

(52) U.S. Cl.
CPC ........ G06F 21/6263 (2013.01); G06F 18/214 (2023.01); G06F 21/84 (2013.01); G06V 30/268 (2022.01); H04L 67/12 (2013.01)

(58) Field of Classification Search
CPC ... G06F 21/6263; G06F 21/84; G06K 9/6256; G06V 30/268; H04L 67/12
See application file for complete search history.

(56) References Cited

U.S. PATENT DOCUMENTS

| 10,346,634 | B2* | 7/2019 | Peterson | G06F 21/6245 |
| 10,708,211 | B2* | 7/2020 | Penilla | H04L 51/42 |
| 10,708,221 | B1 | 7/2020 | Penilla | |
| 10,936,760 | B1* | 3/2021 | Hadsall | G06V 40/1365 |
| 2004/0121842 | A1* | 6/2004 | Willis | A63F 13/335 463/42 |
| 2016/0364736 | A1* | 12/2016 | Maugans, III | H04L 67/306 |
| 2021/0064781 | A1* | 3/2021 | Raphael | G06K 9/6257 |
| 2021/0249009 | A1* | 8/2021 | Manjunath | H04M 1/72469 |

FOREIGN PATENT DOCUMENTS

WO 2020/225258 A1 11/2020

OTHER PUBLICATIONS

International Search Report in PCT International Application No. PCT/US2021/064237, dated Apr. 4, 2022.

* cited by examiner

*Primary Examiner* — Mohammed Waliullah
(74) *Attorney, Agent, or Firm* — Kilpatrick Townsend & Stockton LLP

(57) ABSTRACT

Methods, systems, and apparatus, including computer programs encoded on computer storage media provide for the intelligent detection of sensitive information within a communication platform. The system displays a communication interface including a first input section for receiving an input message associated with a sending user account, and a display section for displaying message information received by the sending user account from other user accounts. The system determines or retrieves a sensitive messaging profile for the sending user account, then receives an input message associated with the sending user account. The system detects that the input message comprises sensitive information, and transmits a sensitive message to one or more receiving user accounts within a sensitive container component, with the sensitive message including at least a subset of the input message.

20 Claims, 9 Drawing Sheets

INTELLIGENT DETECTION OF SENSITIVE DATA WITHIN A COMMUNICATION PLATFORM

FIELD OF INVENTION

The present invention relates generally to digital communication, and more particularly, to systems and methods providing for the intelligent detection of sensitive data within a communication or messaging platform.

BACKGROUND

Digital communication tools and platforms have been essential in providing the ability for people and organizations to communicate and collaborate remotely, e.g., over the internet. Applications for casual friendly conversation ("chat"), work meetings or gatherings, asynchronous work or personal conversation, and more have exploded in popularity. Many allow for participants to enter a conversation using any of a wide variety of devices, and allow for switching between different devices in the middle of a conversation. It has also become common for such applications to allow for documents and media (such as images, video, or audio) to be uploaded to a server, where they can then be transmitted to other chat participants.

While the market for communication and collaboration tools has grown exponentially, concerns over data and privacy have also been growing. Many countries have taken steps to establish robust data privacy and data protection regulations in recent years. In addition, data loss, theft, and leakage are among the most significant issues companies face today. It is often the case that companies and organizations have declined to use communication and collaboration tools because the risk of compromising sensitive data and/or exposing personally identifiable information (PII) of clients, users, or employees is too large, and not enough protective safeguards are in place for securing such information. Such enterprises may have determined that using these tools would risk violation of strict regulations or other policy restrictions for PII or other sensitive data leakage. Such enterprises may feel restricted in their ability to leverage standard corporate communication tools, due to the likelihood of data leakage when mixed with other non-sensitive content. For example, payment card industry (PCI) compliance is mandated by credit card companies to ensure the security of credit card transactions in the payments industry. Credit card information must be secure and protected according to certain technical and operational standards, including strong access control measures. Companies must therefore assess whether their operations are PCI compliant, including the use of communication platforms to transmit and share information.

In some cases, organizations have opted to design their own internal communication tools instead, which is prohibitively costly and resource-intensive. In some cases, organizations will use an existing third-party communication platform, but will exercise rigid measures to safeguard PII and other sensitive information. For example, with respect to an internal company chat channel, the company may take measures to automatically delete the channel's chat history every 24 hours, in order to mitigate the risk of having PII leaked.

Some tools exist for auto-deletion of chat conversations and messages. However, there is a lack of tools on the market for automatic detection of sensitive material such as PII, and then, upon detection, automatic containing or "siloing" of that sensitive material within a secured conversation module until a set expiration window has passed. There is also a lack of tools on the market for preemptive detection of sensitive material before it is submitted. Organizations often discover that PII has been shared only after the sharing is already finished and the material has already been exposed to people outside of the organization.

Thus, there is a need in the field of digital communication tools and platforms to create a new and useful system and method for the intelligent detection of sensitive information within a communication or messaging platform. The source of the problem, as discovered by the inventors, is a lack of ability to intelligently detect sensitive messages as they are being typed into an input window and to transmit the sensitive messages within secure container components with an expiration window applied.

SUMMARY

The invention overcomes the existing problems by enabling fast, contained, and secure methods for the intelligent detection of sensitive data within a communication or messaging platform. A user enters a message into an input window of, e.g., a chat group, channel, or other message platform session with the intent to send the message to one or more recipients, the system detects that the input message includes some sensitive information. In various embodiments, this detection may be performed in various ways such as, e.g., by determining a similarity match between the input message and one or more sensitive information formats; by training one or more artificial intelligence ("AI") engines on a labeled dataset comprising a set of sensitive information and a set of non-sensitive information; parsing the input message as it is being received for one or more sensitivity indicators; or other suitable methods. The sensitive information is then contained within an interface module or "interface component" within the communication interface. This allows for the siloing of sensitive data, persistent or not, within an otherwise non-sensitive chat or conversation. The sensitive information is configured to be auto-deleted after some period of time (an "expiration time window") has expired, in order to maintain the data control requirements of enterprises. This enables people and organizations to reap the benefits of persistent chat and communication technology, while ensuring that shared sensitive information such as PII can be properly contained with regulated access only by certain participants, and will be automatically removed after a set amount of time has passed. The result is a confidential and secure "module" for chat and/or other communication, wherein sensitive information can be automatically and intelligently detected and then placed into the module for protection. In addition to chat messages, the ability to upload sensitive documents and media may also be enabled for placing such sensitive content into the secure module. In some embodiments, this solution also allows for a mixed stream of communication that slips in and out of sensitivity at a message-by-message level, using the containerization of sensitive information within a public chat. This solution also allows for security measures to be enabled at the level of an individual message. These messages can leverage varying timings for auto-deletion to prevent extended data retention.

One embodiment relates to a communication system configured to perform a number of operations. First, the system displays a communication interface for a communication platform, with a first input section for receiving an input message associated with a sending user account. The communication interface also contains a display section for displaying message information received by the sending user account from other accounts. The system then determines or retrieves a sensitive messaging profile for the sending user account, which provides data with respect to how sensitive messages have been sent previously and how recipients received them. Next, the system receives an input message associated with the sending user account. The system detects that the input message includes sensitive information. Based on the sensitive messaging profile, the system then transmits a sensitive message to one or more receiving user accounts within a sensitive contained component, where the sensitive message includes at least a subset of the input message. The sensitive message becomes accessible upon a receiving user account engaging with the sensitive container component for the duration of an expiration time value.

In some embodiments, the system displays a sensitive data user interface ("UI") based on the sensitive message protocol. This UI includes a second input section for receiving a sensitive message, where the second input section is pre-filled with the sensitive information from the input message. The UI also includes an interface control for setting up an expiration time value for the sensitive messages. The system transmits a notification to at least a receiving user account that a sensitive message has been sent. The sensitive message is then accessible by the receiving user account for the duration of the expiration time value.

In some embodiments, the system sends a query to the sending user account on whether to proceed with the sensitive message as recommended. If the user selects that he or she wishes to proceed with the sensitive message, then the user may be directed to the sensitive data user interface with the sensitive information pre-filled within the interface. Otherwise, the sensitive message can be sent as a typical non-sensitive message within the communication platform to one or more intended recipients.

In some embodiments, the system is configured to train one more artificial intelligence ("AI") engines, such as a machine learning (ML) or other AI engine on a labeled dataset that includes a set of sensitive information and a set of non-sensitive information which are labeled as such. The AI engines process the input message as it is being received to generate a prediction within a confidence threshold that the input message includes sensitive information.

In some embodiments, the system determines that the input message includes sensitive information by parsing the input message as it is being received for one or more sensitivity indicators. In some embodiments, at least one of the sensitivity indicators is associated with, e.g., sentiment analysis, emotional analysis, content analysis, text classification, and/or natural language processing. In some embodiments, at least one of the sensitivity indicators is a user-customized sensitivity indicator retrieved from the sensitive message profile of the sending user account. In some embodiments, at least one of the sensitivity indicators has been generated by an authorized third party.

In some embodiments, the system retrieves one or more documents associated with the sending user account which contain one or more confidentiality tags. The detection can then occur by the system determining similarity matches, within a confidence threshold, of the input message as it is being received to the contents of the documents. In some embodiments, some of the confidentiality tags are generated by user-customized tagging.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein.

DETAILED DESCRIPTION

Figure 1A:
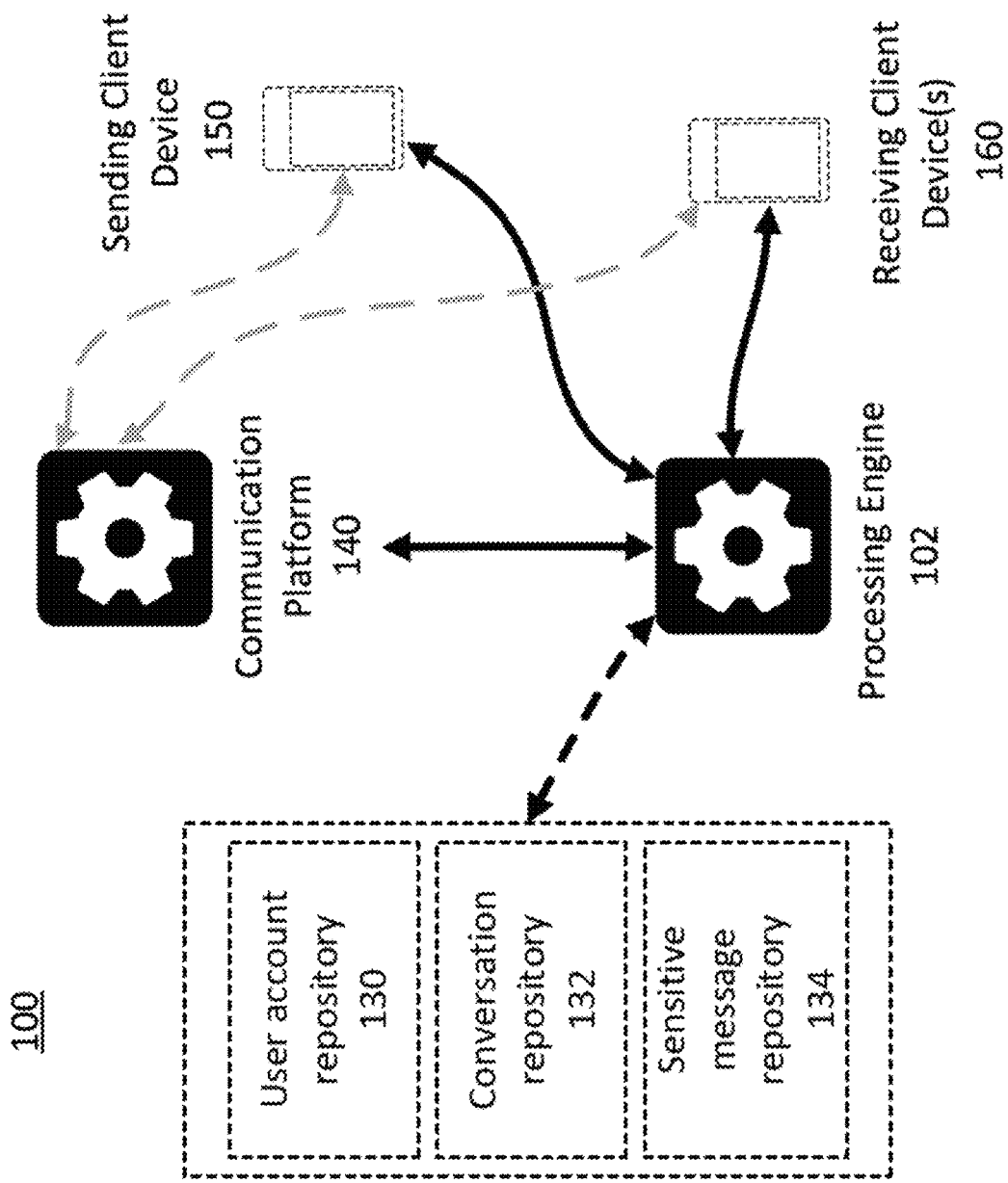
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

By way of illustration, a customer service representative from a company may use a communication platform to have a conversation with the representative's manager. The conversation pertains to the representative seeking the manager's help with a problem a customer is having with the company's payment system. In the process of dealing with the customer's problem, the customer service representative plans to sends a message containing the customer's credit card number to his manager. The customer service representative has opened a chat window with his manager, and has started typing out a request for help to his manager while including the customer's credit card number in that typed-out request.

In previous approaches, the user would not be prohibited from submitting the user's credit card company as a message to his manager; nor would there be any prompt or warning suggesting that sensitive PII may have been leaked. The sharing of the credit card information may either result in the credit card information being present in the conversation and exposed indefinitely, leading to PCI violations, or it may result in the company opting to delete the entire conversation automatically at a specified time, e.g., every 24 hours, and thus lose the ability to retrieve the conversation solving the customer's problem. In some approaches, the credit card information would have to go in a completely separate conversation window, thus separating the credit card information from the conversation which provides context for why the information is being shared.

In contrast, the current approach would entail the customer service representative beginning to type out the credit card information in the message input window. As the representative begins typing out the credit card information, the system detects that the input message includes sensitive information, namely, the credit card number and other associated details. The representative is sent a notification on his client device informing him of the possibility of sensitive data that is in the process of being typed out, and includes the section the representative typed out, with the credit card number in particular being highlighted. The representative responds to the notification confirming that the content is sensitive in nature. While the rest of the chat may consist of non-sensitive content, the customer service representative can select an option to upload the sensitive content represented by the highlighted section, then paste the sensitive content into an input window at a sensitive data user interface. The customer service representative can also set an expiration time window of 1 day from the time that the customer service representative sends the sensitive message, after which the sensitive content (i.e., the credit card number) is no longer accessible in the chat and is removed from the server where it was temporarily hosted. Meanwhile, the rest of the non-sensitive messages remain accessible, and there is no loss of context nor information about the specific problem the customer was having. Should the representative need to refer to the conversation in the future, it will still be available, albeit without the sensitive message containing the credit card information. The company therefore can avoid potential PCI violations before sensitive information is even submitted within a chat or conversation, and it need not adopt a policy of deleting all conversations within the communication platform.

I. Exemplary Environments

FIG. 1A is a diagram illustrating an exemplary environment in which some embodiments may operate. In the exemplary environment 100, a sending client device 150 and one or more receiving client device(s) 160 are connected to a processing engine 102 and, optionally, a communication platform 140. The processing engine 102 is connected to the communication platform 140, and optionally connected to one or more repositories and/or databases, including a user account repository 130, conversation repository 132, and/or a sensitive message repository 134. One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment, the processing engine 102 may perform the method 200 (FIG. 2A) or other method herein and, as a result, provide intelligent detection of a sensitive message within a communication platform. In some embodiments, this may be accomplished via communication with the sending client device, receiving client device(s), processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computing devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories can include one or more of a user account repository 130, conversation repository 132, and/or sensitive message repository 134. The optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database (s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication.

Figure 1B:
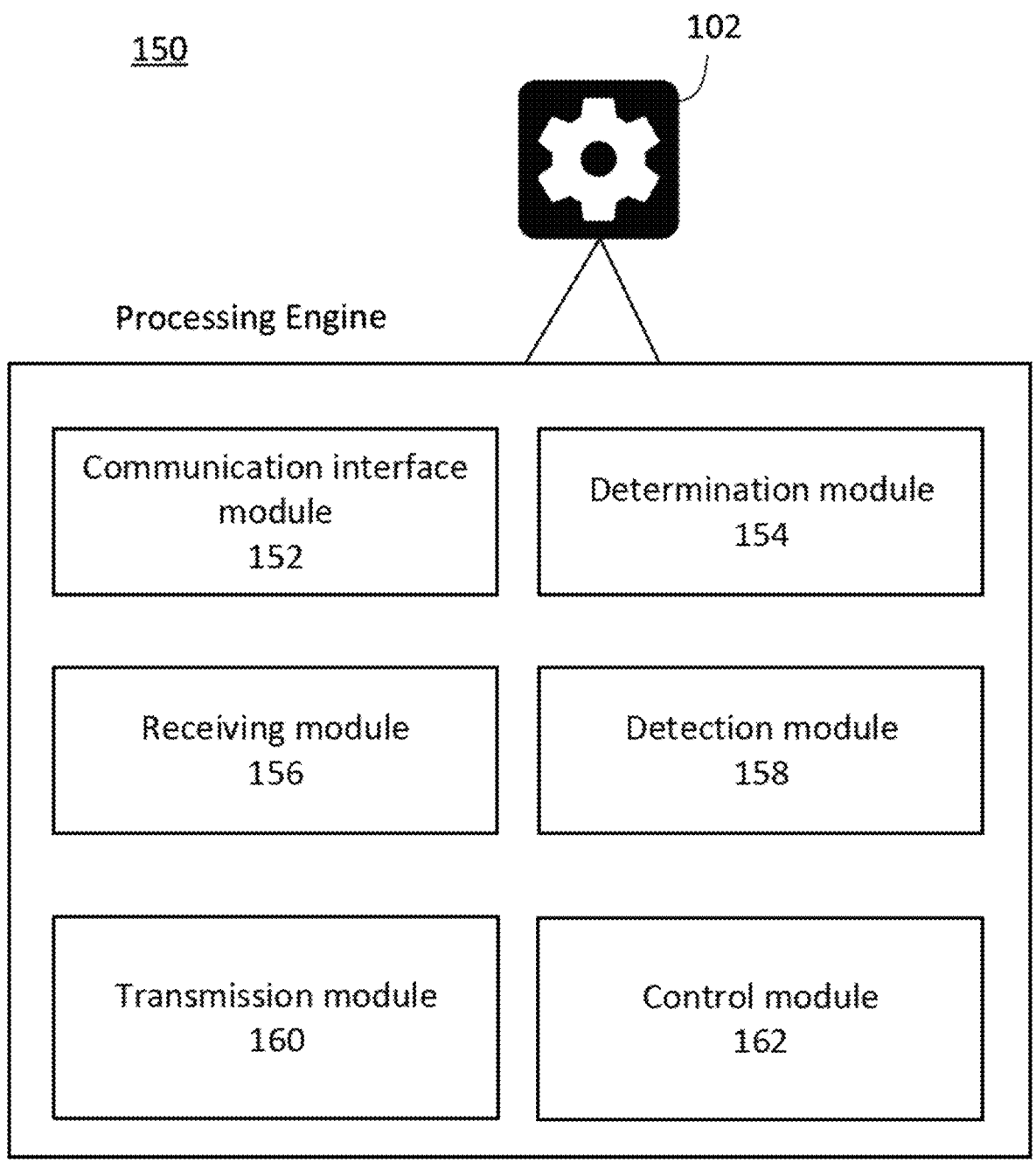
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Communication interface module 152 functions to display a communication interface at the sending client device, including a first input section for receiving an input message from a sending user account, and a display section for displaying message information received by the sending user account from other user accounts.

Determination module 154 determines or retrieves a sensitive messaging profile for the sending user account.

Receiving module 156 functions to receive an input message associated with the sending user account.

Detection module 158 functions to detect that the input message comprises sensitive information.

Transmission module 160 functions to transmit a sensitive message to one or more receiving user accounts within a sensitive container component, with the sensitive message including at least a subset of the input message.

Optional control module 162 functions to provide one or more controls within the user interface provided for the sending user account, with the controls allowing the user to select and configure different aspects of how the sensitive message is to be sent and what it contains.

The above modules and their functions will be described in further detail in relation to an exemplary method below.

II. Exemplary Method

Figure 2A:
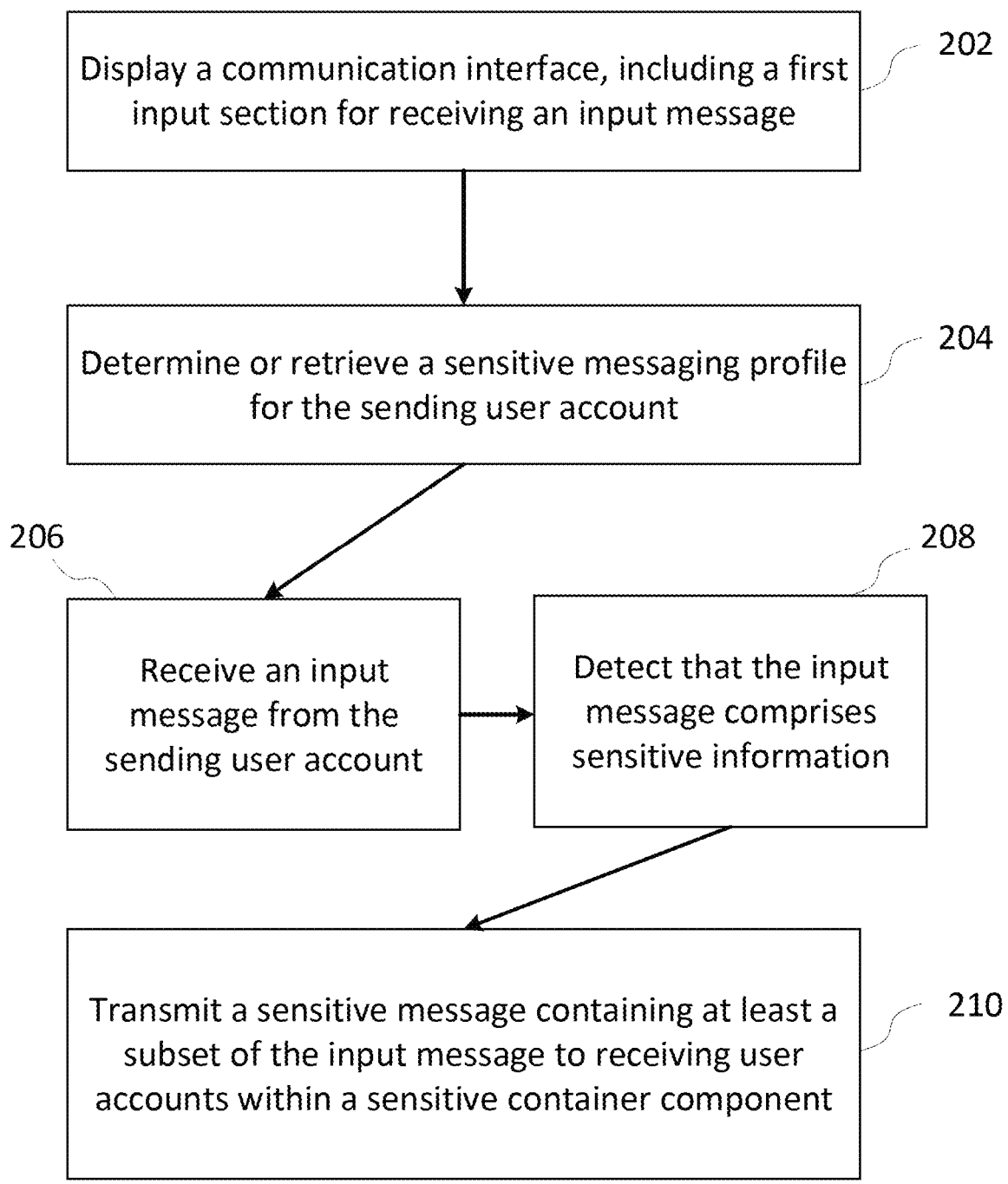
FIG. 2A is a flow chart illustrating an exemplary method 200 that may be performed in some embodiments.

FIG. 2A is a flow chart illustrating an exemplary method that may be performed in some embodiments.

At step 202, the system displays a communication interface at the sending client device. The communication interface relates to the communication platform 140, and may represent a "chat window", such as a window within a GUI that displays a conversation between that sending user account and one or more other user accounts. The communication interface includes at least a first input section for receiving an input message associated with a sending user account, and a display section for displaying message information received by the sending user account from other user accounts. One example of a communication interface within a communication platform is illustrated in FIG. 3.

Figure 3:
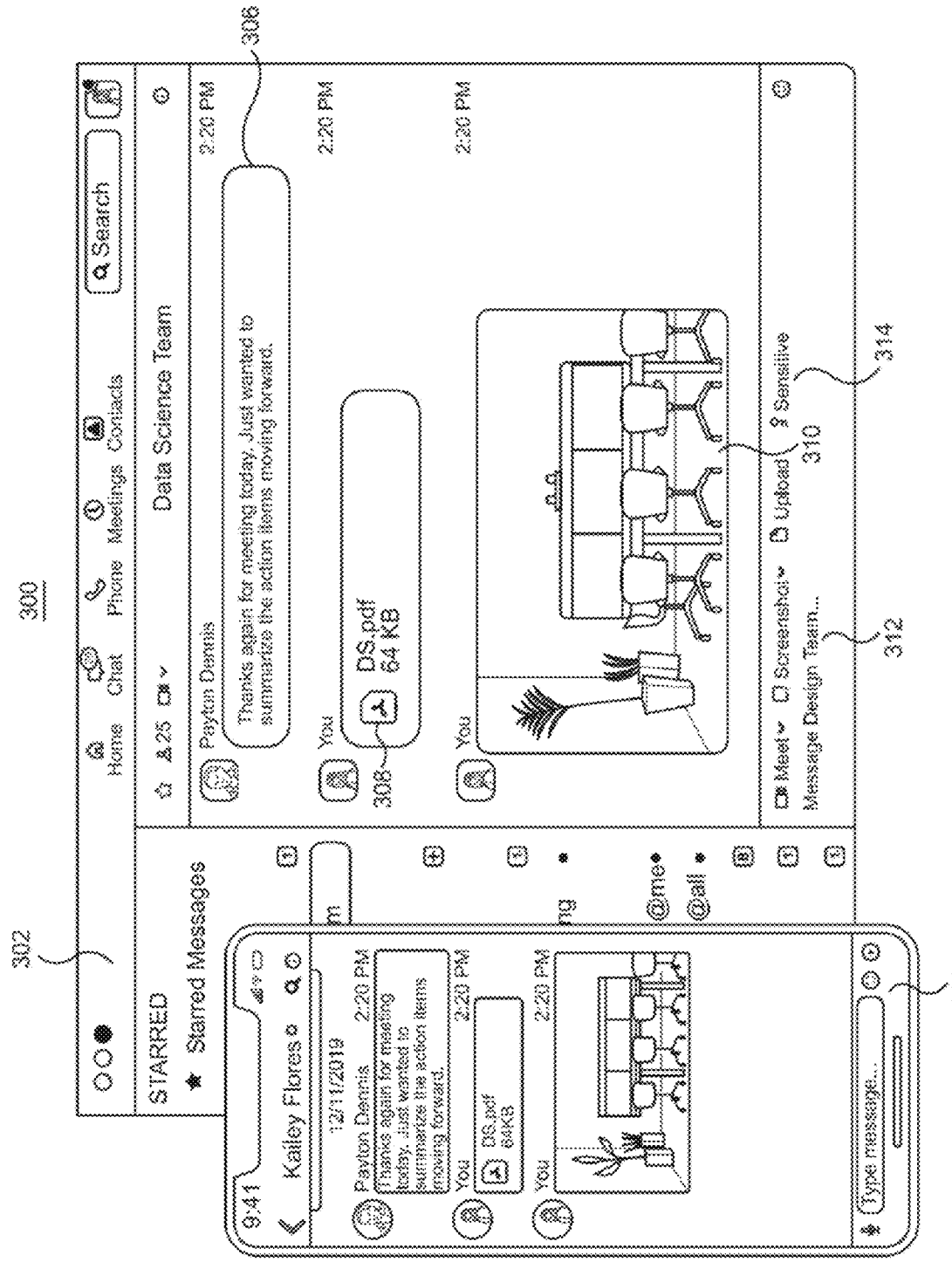
FIG. 3 is a diagram illustrating one example embodiment 300 of a communication or messaging platform, in accordance with some embodiments.

FIG. 3 is a diagram illustrating one example embodiment 300 of a communication interface within a communication platform, in accordance with some embodiments.

Within the example embodiment 300, the communication or messaging platform is displayed as a "chat" or conversation window. Other embodiments may appear as, e.g., a chat room, message forum, virtual meeting space, or any other suitable interface for communication. Two modalities are shown in the example embodiment 300, corresponding to two example devices which may be used to access the communication platform: a desktop or laptop interface 302, and a smaller mobile device or smartphone interface 304. Both modalities are configured to display chat content, including messages, shared media, and more, although the layout and interface may differ.

Within the chat window, messages and other content are displayed. A textual message 306 is shown. The message 306 is sent by another user and is received by the user accessing the chat on the device. Other participants in the chat may be present in the chat and/or viewing messages, but not sending chat messages. In some embodiments, the user can display a list of current members participating in the chat.

Another message 308 consists of an attached file which is shared with the participants of the chat. The attached file is a PDF document which can be displayed and viewed on user devices. Yet another message 310 consists of a shared image file which is displayed and viewable within the chat window by default. Other media may be shareable, including, e.g., audio and video.

At the bottom of the interface, an input window 312 allows the user associated with the device to input a message. Upon submitting, the message will be sent to the participants of the chat and will appear as a message within the chat window. In some embodiments, one or more participants may opt to receive notifications when messages are posted within the chat window. In addition to the input window, the user may also select UI elements (such as, e.g., buttons) for switching to a video meeting ("Meet"), taking a screenshot of the chat window ("Screenshot"), and uploading files or documents to share with other participants of the chat ("Upload"). There is also a UI element 314 for sending a sensitive message and/or sensitive data ("Sensitive)".

Returning to FIG. 2, step 202, the first input section functions to provide a way for a sending user account to enter a message (e.g., a chat message) to be submitted within the conversation such that one or more recipients within the conversation can receive and access the message. In some embodiments, the input message is textual. In some embodiments, the input message may be a mix of textual and non-textual elements. The input message may include, for example, emojis, icons, voice-to-text transcription, text-to-voice audio content, any other audio content, image content, video content, audiovisual content, or any other suitable form or method of digital communication or sending of data. In some embodiments, various GUI elements may appear in different contexts to facilitate the input of the input message, such as, e.g., a pop-up virtual keyboard. In some embodiments, as the user types the message into the chat window, the system concurrently parses the message in order to detect any sensitive information, as will be described in further detail below.

The display section functions to provide a way for the sending user account to receive incoming messages from other users who are privy to the conversation or chat window. In some embodiments, one or more GUI elements may appear to provide some notification that a new message has appeared within the conversation.

In some embodiments, the communication interface first authenticates the sending user account and/or sending client device as legitimate and authorized prior to displaying the communication interface. Authentication may be provided via one or more first party or third party authentication tools. Such authentication processes or techniques may include, e.g., multi-factor authentication (MFA), OAuth, OpenID Connect, SAML 2.0, a password, an RSA SecurID token, integrated authentication using a directory service, a client certificate, any other form of authentication, or a combination thereof. In some embodiments, a secondary login may be required other than a user's primary user account which requires separate authentication for purposes of sending sensitive messages. In some embodiments, one or more access control components or techniques may be provided for regulating access of the sending user account to various features. In some embodiments, access logging may be implemented in various ways. In some embodiments, a timeline or other document may be automatically generated with respect to a sending user account during or after the authentication process.

In some embodiments, the system delivers one or more prompts to the sending user account during the sending user's experience navigating within the communication interface and communication with one or more other users. The prompts may provide some form of notification, message, or gentle reminder that a user has sent a message within the chat window, the sending user has been disconnected from the chat or has an unstable internet connection, the user's message or file has been sent, a sensitive message has been sent to the sending user, or any other suitable reason for notification or prompting of the sending user.

At step 204, the system determines or retrieves a sensitive messaging profile for the sending user account. In varying embodiments, the sensitive messaging profile takes the form of, e.g., one or more electronic records, datasets, or collections of data containing user preferences, past activity, historical data and/or similar pieces of data with respect to how the user has handled sensitive data within the communication platform. The sensitive messaging profile may include a number of pieces of information pertaining to the user's preferences, past selections, characteristics, routine behaviors, or any other suitable information with respect to sensitive messages. In some embodiments, as the system analyzes the user's choices and habits with respect to sensitive messages, more information is generated which is added to the sensitive messaging profile for future sessions. In some embodiments, the sensitive messaging profile provides insight into how the user would like the system to react to discovery of potentially sensitive information during a session. In some embodiments, the sensitive messaging profile may be used to determine a set of rules which instruct the system on how to act or not act with respect to sensitive messages based on previous user interactions and preferences. For example, if a user opts to always automatically transfer a message in its entirety into a sensitive message upon the system detecting that the message contains sensitive information, then based on preferences data within the sensitive messaging profile, the system will automatically transfer the message into a sensitive message and continue to adhere to any additional user preferences with respect to sensitive messages.

In some embodiments, the system retrieves, from a sensitive messaging profile, one or more regular expression ("regex") controls relating to sensitive information. Detecting that the input message in later steps can then include and/or prohibit sensitive information based on at least the retrieved regex controls.

At step 206, the system receives an input message from the sending user account. In some embodiments, the message can be sent to the system word by word or in a similar fashion, in real time or substantially real time. The system can be configured to begin parsing words, phrases, or sections before the sending user has finished typing. In some embodiments, the system receives this input message from the sending user account as it is being typed into the first input section. In some embodiments, the system may receive this input message locally on the client device as it is being typed. In other embodiments, the system receives this input message only after it is fully typed and submitted by the sending user account. In some embodiments, the system receives this input message as it is processed over the cloud or some other remote location.

At step 208, The system also detects that the input message comprises sensitive information as it is being received. In some embodiments, this detection is performed concurrent to the system receiving an input message from the sending user account as it is being typed. In other embodiments, this detection is performed only upon receiving a full input message from the sending user account. The system can evaluate an in-progress or completed input message to make this determination in any of a number of ways. In some embodiments, the system can employ Artificial Intelligence (AI) or Machine Learning (ML) techniques and processes to evaluate the input message to determine whether sensitive information can be detected. For example, an ML algorithm may be trained on a labeled dataset representing both examples of sensitive content and non-sensitive content, which are marked as such. The trained ML algorithm may then be able to predict to a given degree of confidence whether new input pieces of content are to be classified as sensitive or non-sensitive content. In some embodiments, this entails generating as prediction within a confidence threshold that the input message comprises sensitive information.

In some embodiments, the system determines a similarity match between the input message and one or more sensitive information formats. In some embodiments, the determining of this similarity match may be performed by an AI engine, as described above. A similarity match within this context can be, for example, a parsing of the input words and/or phrases to compare them on formatting terms to one or more predefined sensitive information formats. For example, a phone number will usually appear within a few easily recognizable formats, as will residential addresses based on a person's country of residence and other factors which can alter the format. The predefined sensitive information formats can be, in varying embodiments, formats in which PII is often predictably presented which can cause some reason for the system to be alerted and to analyze further to determine how close of a similarity match has been found. In some embodiments, the system categorizes input as sensitive information upon a given confidence threshold for a similarity match being met or exceeded. In some embodiments, the user or one or more administrators can set the confidence threshold to be higher or lower depending on needs and preferences.

In some embodiments, examples of predetermined formats for PII may include, e.g., formats for social security number, mailing address, phone number, bank account number, full name, passport number, driver's license number, credit card number, email address, or any other suitable information which may be classified as PII. In some embodiments, this predefined list of PII formats can be retrieved from and/or determined from the sensitive messaging profile, which provides instructions which respect to using predetermined formats to analyze the input message.

In some embodiments, the system parses the input message as it is being received for one or more sensitivity indicators. Such sensitivity indicators may be associated with, e.g., one or more of sentiment analysis, emotion analysis, content analysis, text classification, and/or natural language processing. For example, parsing for sentiment analysis may include detecting words or phrases which express an opinion on the sensitivity or non-sensitivity of the material, whereas emotion analysis may detect a heightened emotional sense to a chat between two people in the presence of sensitive information. Many different possibilities can be contemplated within how such analyses are performed in various contexts. In some embodiments, the user themselves or an administrator may have opted to customize at least one of the sensitivity indicators during a previous session, and these customized indicators may be retrievable via the sensitive messaging profile for that user. In some embodiments, at least one of the sensitivity indicators has been generated by an authorized third party. For example, a third party company may be authorized to specifically provide tools to users of the communication platform regarding detection of sensitive content. The third party company may use an application programming interface (API) or other method to integrate such tools with the communication platform.

In some embodiments, upon the system detecting that the input message contains sensitive information, the sending user can receive a confirmation window which includes the predicted sensitive content in question, along with a statement such as "This may be sensitive information. Can you confirm?" The user can then either confirm or deny that it is sensitive content. If the user confirms that it is sensitive content, then in some embodiments, a sensitive data user interface appears with the content in question copied into the input window. If the user selects that the text in question is not sensitive content, then in some embodiments, the confirmation window is closed and the user can resume their activities on the communication platform, or alternatively, the message can be continued by the user, submitted, and will be sent as non-sensitive information in a usual fashion.

In some embodiments, upon detection of sensitive information, or upon a user confirming that sensitive information exists within an input message, the communication platform can be capable of displaying a detection control user interface. The detection control user interface may be a separate interface from the communication interface, or can be incorporated in various ways into the communication interface. The detection control user interface functions to allow the sending user and/or an organization associated with the sending user to set various controls for how and in which situations the system is to detect that sensitive content is present. In some embodiments, the detection control interface may include an interface control for setting a detection threshold for the sensitive message.

In some embodiments, the system displays a sensitive data user interface (UI) at the sending client device upon detection and/or confirmation of sensitive information within the input message. The sensitive data UI can include at least a second input section for receiving a sensitive message and an interface control for setting an expiration time value for the sensitive message. The sensitive data UI is contained within a separate module of the communication interface, such as a pop-up window element, separate window from the existing windows, a contained window inside an existing communication interface window, or any other suitable contained element within the GUI. In some embodiments, the sensitive data user interface appears as a message within the conversation with some visual changes to demarcate it from other messages.

In some embodiments, the second input section of the sensitive data UI functions to receive a sensitive message from the sending user account. In some embodiments, it is functionally and/or visually similar or identical to the first input window, but is situated as an element within the contained sensitive data UI. Visual elements and appearance (e.g., color, fonts, styles, or other visual elements) may differ from the first input section.

In some embodiments, the second input section of the sensitive data UI includes one or more elements which allow the user to input a combination of sensitive content portions and non-sensitive content portions. This may allow the user to, for example, provide a non-sensitive portion which provides context for the sensitive portion. For example, a user may input a non-sensitive portion which reads: "The following information is confidential and is not to be shared or transmitted to anyone outside of this chat." The sensitive portion may then follow that statement.

The interface control for setting the expiration time value for the sensitive message provides a way for the sending user to control the expiration time value. The expiration time value represents the amount of time that the sensitive message will be accessible by recipients of the sensitive message, i.e., receiving user account(s). In some embodiments, the expiration time value represents a duration which is initiated when the sensitive message was transmitted to the receiving user account. In other embodiments, the expiration time value represents a duration which is initiated when a notification about the sensitive message is received by the first receiving user account. In yet other embodiments, the duration is initiated when the sensitive message is first accessed by a receiving user account.

In some embodiments, multiple expiration time values can be set, one for each receiving user account, and the duration is initiated when each receiving user account accesses or, alternatively, receives a notification about the sensitive message. For example, within the context of a group chat window, each receiving user account might have five minutes to view the sensitive content upon accessing it.

In some embodiments, the interface control may appear as a dropdown menu which allows the sending user to select from different durations. For example, a user may be able to select an expiration time value of, e.g., one hour, twelve hours, one day, one week, or any other suitable duration. In some embodiments, the interface control also allows the sending user to set what condition triggers the start of the expiration time window. For example, a user may be provided with the option to set the start of the expiration time window as: when the first recipient receives a notification that the sensitive message has been sent to them; when each recipient receives a notification that the sensitive message has been sent to that recipient; upon the sensitive message being sent by the sending user; or any other suitable condition for initiating the expiration time window.

In some embodiments, an additional interface control is displayed within the sensitive data user interface which allows the user to restrict the sensitive message from being accessible by third-party recipients. If the sending user account chooses to enable and set this control, then the sensitive message will be accessible by the intended recipients within the conversation or chat room, but those recipients will be restricted from sharing the content with additional third parties. In some embodiments, restrictions may be in place such as disabling the ability to copy or paste the sensitive content, disabling the ability to take screenshots of the sensitive content, or otherwise restricting the user from sharing the content. In some embodiments, an interface control or element may be displayed which allows the sending user account to restrict the user content from being accessible by one or more specific user accounts (i.e., a "blacklist"), and/or permit the user content to be accessible only by specific user accounts (i.e., a "whitelist").

At step 208, the system transmits a sensitive message containing at least a subset of the input message to receiving user accounts within a sensitive container component. The system may transmit this sensitive message as a container within a message window of the chat or conversation interface, may transmit the message as a pop-up element or other UI element, may provide a push notification to a client device, or may otherwise transmit the sensitive message. In some embodiments, the message itself is not immediately accessible or viewable, but rather must be engaged with (i.e., clicked on or otherwise interacted with) in order for the sensitive information to be revealed.

In some embodiments, the sensitive message is represented within a container with a visual mask, such that the sensitive message cannot be viewed. Upon a user clicking on the container, the visual mask is removed and the sensitive message can be viewed. In some embodiments, the visual mask includes text indicating that the information is sensitive and will be displayed upon the user interacting with the element. Other possibilities may be contemplated for how the sensitive message is displayed by default. In some embodiments, the sending user account is able to control different aspects of how the sensitive message will be displayed, and such controls appear within the sensitive data user interface when the sensitive message is being composed.

In some embodiments, the system encrypts the sensitive message. In some embodiments, the encryption of the sensitive message is based on a hash-value associated with the receiving user account. Security or cryptographic keys, account level personal identification numbers (PINs), non-hash-based encryption such as, e.g., Transport Layer Security (TSL) encryption, or any other suitable form of encryption or hashing may be contemplated. In some embodiments, the system temporarily stores the encrypted sensitive message in a data repository, such as a local or remote data storage device, remote repository, cloud storage location, or other suitable storage location. The system then provides an indication to the receiving user account that a sensitive message has been sent to the receiving user account. The system then receives an attempt to access the encrypted sensitive message by the receiving user account. If the receiving user account accesses the sensitive encrypted message within the expiration time value, then the system decrypts the encrypted sensitive message and provides the sensitive message in a non-encrypted form to the receiving user account. The system then removes (i.e., permanently deletes) the temporarily stored encrypted sensitive message from the data repository. In some embodiments, the system authenticates the receiving user account prior to decrypting the encrypted sensitive message. The authentication may involve OAuth, multi-factor authentication, or any other suitable user authentication process.

In some embodiments, upon the receiving user gaining access to the sensitive message, the system generates a date/time stamp as a log of the user's access. The log can then be retrieved in various circumstances, such as for security, monitoring, and/or other purposes. In some embodiments, such logs can be exported to a log file automatically (e.g., at a periodical interval or upon some triggering event which can be set) or manually.

In some embodiments, upon the lapsing of the expiration time window, the sensitive message is removed, and the content is also permanently deleted from any location where it exists, including any cloud storage or other data repository the sensitive message was retrieved from, if applicable. In some embodiments, no record of any sensitive message will remain, and the container will be removed completely. In other embodiments, the container window will remain, but a visual and/or textual indication will appear that the sensitive message is no longer accessible. In some embodiments, information will be logged that a sensitive message was sent within a chat log, but the sensitive message will not appear, either before or after the expiration time value has lapsed.

In some embodiments, rather than the content being permanently deleted upon the lapsing of the expiration time window, the content is instead edited or modified, and continues to be accessible for receiving user accounts and, optionally, additional users. As one example, a sensitive document may contain a large amount of non-sensitive content mixed with a small amount of sensitive content, with the sensitive content being indicated in file metadata or otherwise indicated. Upon the lapse of the expiration time window, the document may be automatically configured to be modified such that the indicated sensitive content is redacted or outright removed while the non-sensitive content remains unedited. Many other such possibilities may exist for editing or modification of documents and messages upon the expiration time value lapsing. In some embodiments, the sensitive content may be removed and replaced with different content. For example, a document file with sensitive content may be removed, and a redacted version of the document file may replace it upon the expiration time window lapsing.

In some embodiments, rather than remove the source file or document completely, other actions may be taken. For example, in various embodiments, the file may be transferred to a different storage location, such as an archival storage device or cloud location, or archived using a third-party archival service.

In some embodiments, the receiving user accounts may be from one or more specific groups of receiving users that have been predetermined or assigned. For example, an organization may designate its finance department to be able to receive sensitive messages, but not its customer service department. The system can be configured such that sensitive messages can only be sent out to the finance department as a group, or other groups which have been similarly approved for receiving sensitive messages.

Figure 2B:
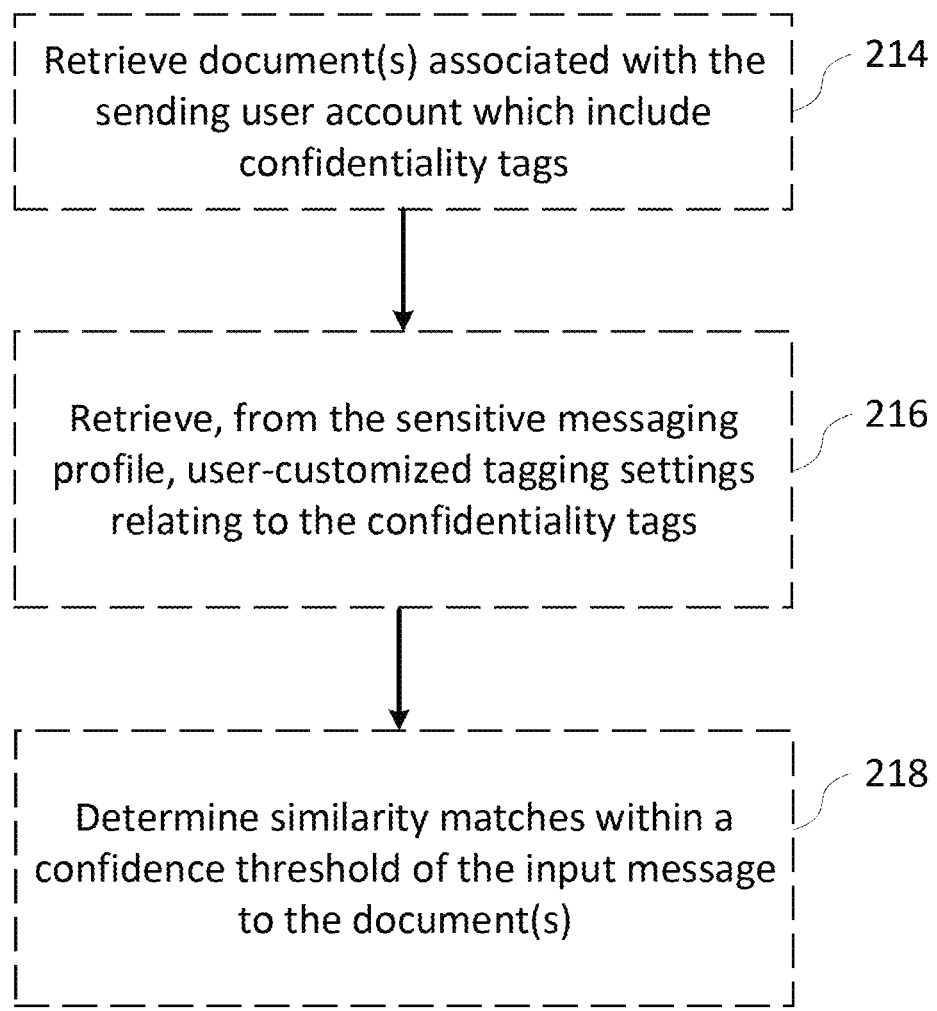
FIG. 2B is a flow chart illustrating an exemplary method 250 that may be performed in some embodiments.

FIG. 2B is a flow chart illustrating another exemplary method that may be performed in some embodiments.

At step 214, the system retrieves document(s) associated with the sending user account which include confidentiality tags. Confidentiality tags are "flags" or indicators which are used as metadata within documents to indicate that the document in question contains one or more sections of confidential or sensitive material. In some embodiments, confidentiality tags may appear as a structured set of tags within a document. Documents may be, e.g., word processor documents, spreadsheets, presentations, customer profile databases, or any other documents which may potentially contain confidential information. Confidentiality tags can be useful for alerting others to the existence of confidential material within the document. In some embodiments, confidentiality tags are indexable and searchable, and can contain granular information regarding the nature of the confidential material.

At step 216, the system retrieves, from the sensitive messaging profile, user-customized tagging settings relating to the confidentiality tags. If the system is able to retrieve such user-customized tags within the sensitive messaging profile, the system treats them as indications of how the user would like to proceed with respect to sensitive material of a certain kind.

At step 218, the system determines similarity matches within a confidence threshold of the input message to the document(s). The system will attempt to run a similarity match between the input message and the document to see if any overlapping or similar sections appear to indicate that the input message is sensitive, confidential material.

Figure 4:
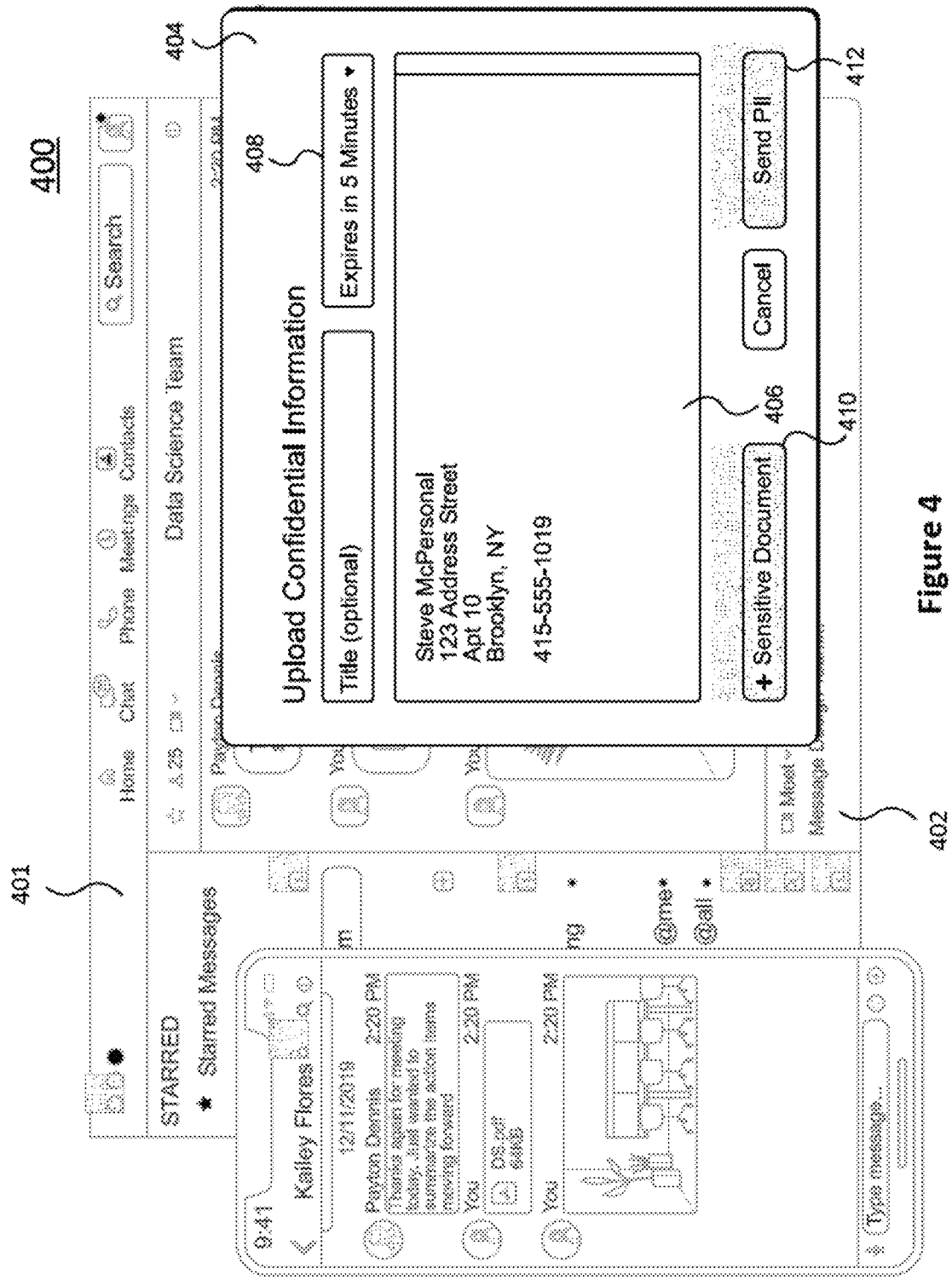
FIG. 4 is a diagram illustrating one example embodiment 400 of providing containment of sensitive information within a communication or messaging platform.

FIG. 4 is a diagram illustrating one example embodiment 400 of providing containment of sensitive information within a communication or messaging platform.

Communication interface 401 in this example embodiment displays a chatroom with a number of participants, including a sending user and a number of receiving users. Message 402 is an example of a non-sensitive message input window within the communication platform. A number of UI elements within the message window (or message bubble) allow the sending user to reply with a message, switch to a video meeting, or perform other actions. As shown in FIG. 3, UI element 314, a button marked "Sensitive" may also be interacted with to initiate one or more windows or UI elements for sending a sensitive message.

Upon clicking the "Sensitive" button or a similar UI element, a pop-up window UI element appears overlaid on top of the conversation window. This the sensitive data user interface 404. In one example, the sending user has begun typing a message into an input window to reply to the message 402, and then the system determined that a need exists for inputting sensitive information upon the system determining that the information being entered is sensitive. In this case, the information is Steve McPersonal's address and phone number, both of which are determined to be PII. In response, the sensitive data user interface 404 UI element automatically pops up upon the system determining that sensitive input is needed, and the PII the sending user typed into the input window is copied to the sensitive data user interface's input window 406. The sensitive data UI also provides an interface control 408 which allow the sending user to select from a dropdown menu one of a number of available expiration time window values, representing a time at which the message will be auto-deleted.

Additional UI elements within the sensitive data UI include a sensitive document upload button 410, which allows the sending user to optionally upload sensitive documents, files, or media. Such sensitive documents may be, for example, a word processor document, a spreadsheet document, an audio file, an encrypted text document, a set of images, or a video file. In some embodiments, the documents may be automatically scanned by the system for potential viruses, malware, and/or other security threats. A cancel button also appears within the sensitive data UI to cancel the sensitive message, and a Send PII 412 button appears to submit the sensitive message within the conversation, to be sent to the participants of the conversation as receiving users.

Figure 5A:
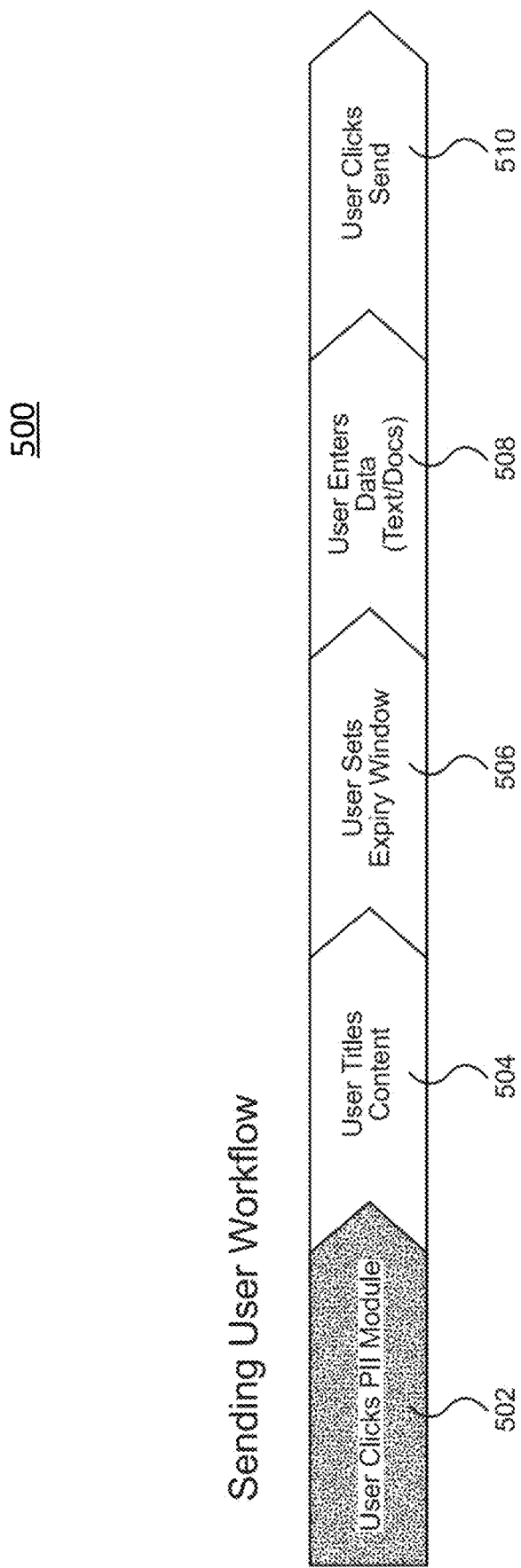
FIG. 5A is a diagram illustrating one example embodiment 500 of a sending user workflow, in accordance with some embodiments.

FIG. 5A is a diagram illustrating one example embodiment 500 of a sending user workflow, in accordance with some embodiments.

At step 502, the sending user (i.e., a user associated with a user account which will be sending a sensitive message) clicks a PII or sensitive data module within a communication interface of a communication platform. Specifically, the sending user is presented with a communication interface which may include, for example, a chat or conversation window as well as a standard input window for entering messages, as illustrated in FIG. 3 or FIG. 4. The sending user has a need to transfer data which the sending user knows to be sensitive data. A module above the standard chat input window may be presented as a button or other interactive UI element and is marked as, e.g., "Input Sensitive Data", "Input PII", "Send a Sensitive Message", or similar. Upon clicking on or otherwise interacting with the module, a separate window (e.g., a pop-up window or other contained element) appears. The separate window may be marked as, e.g., "Upload Confidential Information" or similar, as illustrated in FIG. 4 with respect to the sensitive data user interface 404. The separate window may include various components or elements for uploading a sensitive message and setting controls for how the sensitive message is to be sent. In the example embodiment, such controls include an input field for entering a title, a dropdown menu for setting an expiry window (i.e., an expiration time value), and an input window for entering a sensitive message.

At step 504, the sending user titles the content by entering a title into the input field for entering a title. This title functions to allow the receiving user(s) to ascertain the relevance of the content, and provides some context for the sensitive message contained within. The title can also help with discovery tasks. In some embodiments, the title is indexable for later search activities. In some embodiments, the title may also appear in chat logs pertaining to the conversation.

At step 506, the sending user sets an expiry window, i.e., an expiration time value, by interacting with the dropdown menu for setting the expiry window. This dropdown menu for setting the expiry window is illustrated in FIG. 4 with respect to interface control 408. The sending user can set an expiration time value for one of a number of predefined durations (e.g., 5 minutes, 1 hour, 1 day, etc.) In some embodiments, the menu options may include "Never Expire", which configures the accessibility of the sensitive message to have no expiration time within the conversation. In some embodiments, the dropdown menu or some other element within the sensitive data user interface may allow the sending user to select whether the expiration occurs upon, e.g., each receiving user accessing the sensitive message, the sending user sending the sensitive message, a first receiving user accessing the sensitive message, each receiving user receiving a notification about the sensitive message being sent, or any other suitable condition for initiating the expiration window.

At step 508, the sending user enters data, such as textual data, into the input window for entering a sensitive message. This input window is illustrated in FIG. 4 with respect to input window 406. In some embodiments, the sending user can enter multi-line text with formatting. In some embodiments, additional options may exist for entering emoji characters or other non-textual symbols or representations. In some embodiments, a UI element appears within the sensitive data user interface that is marked as, e.g., "+Sensitive Document", "Upload Sensitive Document", "Attach Sensitive File," or similar. The sending user can click on or otherwise interact with the UI element to upload a file or document which is to be sent as a sensitive document. An example of this is illustrated in FIG. 4 with respect to sensitive document upload button 410.

At step 510, the sending user clicks or otherwise interacts with a "Send" button or other UI element which appears on the sensitive data user interface. In some embodiments, the "Send" UI element is illustrated in FIG. 4 with respect to the Send PII button 412. Upon the sending user clicking the "send" button, the sending user is prompted with a confirmation window notifying the sending user that this sensitive content cannot be edited later. In some embodiments, there may be a checkbox UI element present in the confirmation window marked "Do Not Show Me This Again" or similar, which prevents the confirmation window from appearing in future sessions. Upon clicking a button marked "Send", "OK", or similar, the system attempts to send the sensitive message, sensitive files or documents, or both. In some embodiments, upon an unsuccessful attempt to send the sensitive message, the sending user may receive an error message or other notification informing them of the unsuccessful attempt, and may provide some instruction on next steps, an error code, or similar messages.

Figure 5B:
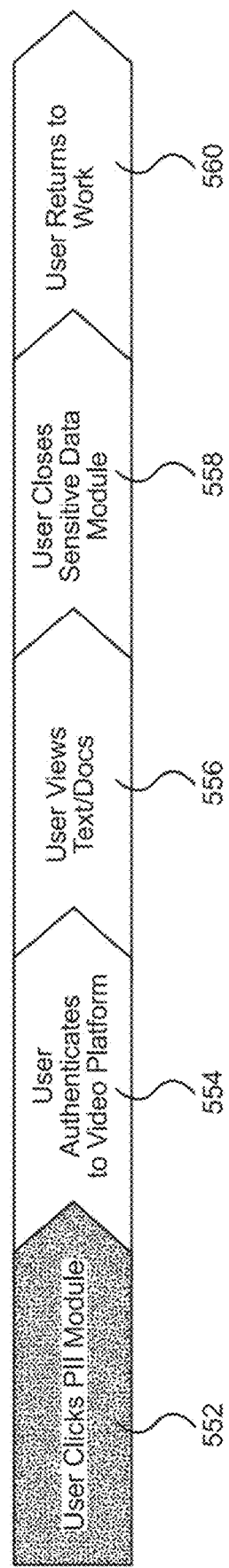
FIG. 5B is a diagram illustrating one example embodiment 550 of a receiving user workflow, in accordance with some embodiments.

FIG. 5B is a diagram illustrating one example embodiment 550 of a receiving user workflow, in accordance with some embodiments.

At step 552, the receiving user clicks a PII or sensitive data module within a communication interface of a communication platform. As in FIG. 5A, the communication interface may be a chat or conversation window. The PII module may appear as a container marked as, e.g., "Sensitive Data", "Sensitive Data Only", "Upload Sensitive Data", "PII", or similar. In some embodiments, the container is placed within a message window, message bubble, or other UI element indicating a message from a particular user. For example, the PII module may appear as a container within a message from the sending user from FIG. 5A. In some embodiments, the PII module may additionally include a title, such as the title set by the sending user in FIG. 5A, step 504, and/or the expiry window, such as the expiry window set by the sending user in FIG. 5A, step 506. Both the title and the expiry window can appear within the PII module without the user interacting with or clicking on the PII module. In some embodiments, the PII module may also contain elements such as, e.g., a lock icon and a button marked as "Open Sensitive Information" or similar. Before the user interacts with the PII module, no sensitive message or content is visible or accessible.

At step 554, the receiving user authenticates within the communication platform. In some embodiments, the receiving user is presented with a modal login interface which appears on, e.g., a pop-up window or separate screen. The modal login interface can contain the message "Log in to your account", "Authenticate your user account", or similar. In some embodiments, the user authentication process can involve authorizing or re-authorizing the receiving user account within the communication platform to confirm that the receiving user is in fact the intended receiving user rather than a different, unintended recipient, such as an interceptor with access to an unlocked client device.

At step 556, the receiving user views or otherwise accesses the sensitive message. This may include, e.g., viewing a textual message; viewing, accessing or playing back any uploaded, files, documents, or media; or similar forms of accessing the sensitive content. In some embodiments, the sensitive data is viewed or accessed within a separate container, such as a modal pop-up window. In some embodiments, the receiving user may copy the text, while in some embodiments the user may be prohibited from copying the text due to a security control enabled either by default or set by the sending user or their associated organization. In some embodiments, documents, files, or media may have the option to be viewed or accessed directly within the communication interface. For example, a document in-window may appear within the communication interface allowing for the receiving user to access the document and, in some embodiments, save the document locally (via a "Download" or "Save" UI element or menu option, for example). In some embodiments, the receiving user may be prevented from downloading or saving the document (e.g., by default or as stipulated by the sending user). In some embodiments, the various access options and/or the user selection of options are logged as part of the operations of a security information and event management (STEM) tool, a cloud access security broker (CASB), or similar, in order to log user activities within the communication platform. In some embodiments, upon the user viewing or accessing the sensitive message, the expiration time value is set (e.g., by default or by the sending user) to be initiated, and will begin to count down.

At step 558, the receiving user closes the PII or sensitive data module. Upon finishing with the tasks related to the sensitive data, the user closes the modal pop-up window or other separate container element. In some embodiments, the user may instead close, exit, or be disconnected from the communication platform itself, such as, e.g., by signing out, closing the entire application, or remaining idle for a certain period of time. In some cases, the user may be viewing or accessing the sensitive data while the expiration time window lapses. In such a case, the user may have the pop-up window or container closed automatically by the system with a message about the expiry window lapsing. In some embodiments, the user may receive some warning indication at one or more certain time intervals prior to the expiry window lapsing, such as 10 minutes prior to the expiry window lapsing. In some embodiments, an expiry timer is displayed while the user is viewing the documents, and counts down in real time if the expiration time window has been initiated. In some embodiments, the user may receive a confirmation prompt to start the expiry timer manually.

At step 560, the receiving user returns to work, returns to the work or personal conversation they were having using the communication platform, or otherwise disengages from the sensitive message content, conversation window, and/or communication platform as a whole. In some embodiments, the receiving user will optionally be allowed to reopen the sensitive message until the moment of defined expiry, if applicable and set as such (e.g., by default or by the sending user). In some embodiments, the receiving user must re-authenticate the receiving user account within the communication platform in order to reopen the sensitive message. In some embodiments, the sensitive message settings may be established such that the user may only reopen the sensitive message a predefined number of times. For example, the sending user or their organization may stipulate that each receiving user may only access the sensitive content once, after which the content is no longer accessible, similar to if the expiration time window had lapsed.

Figure 6:
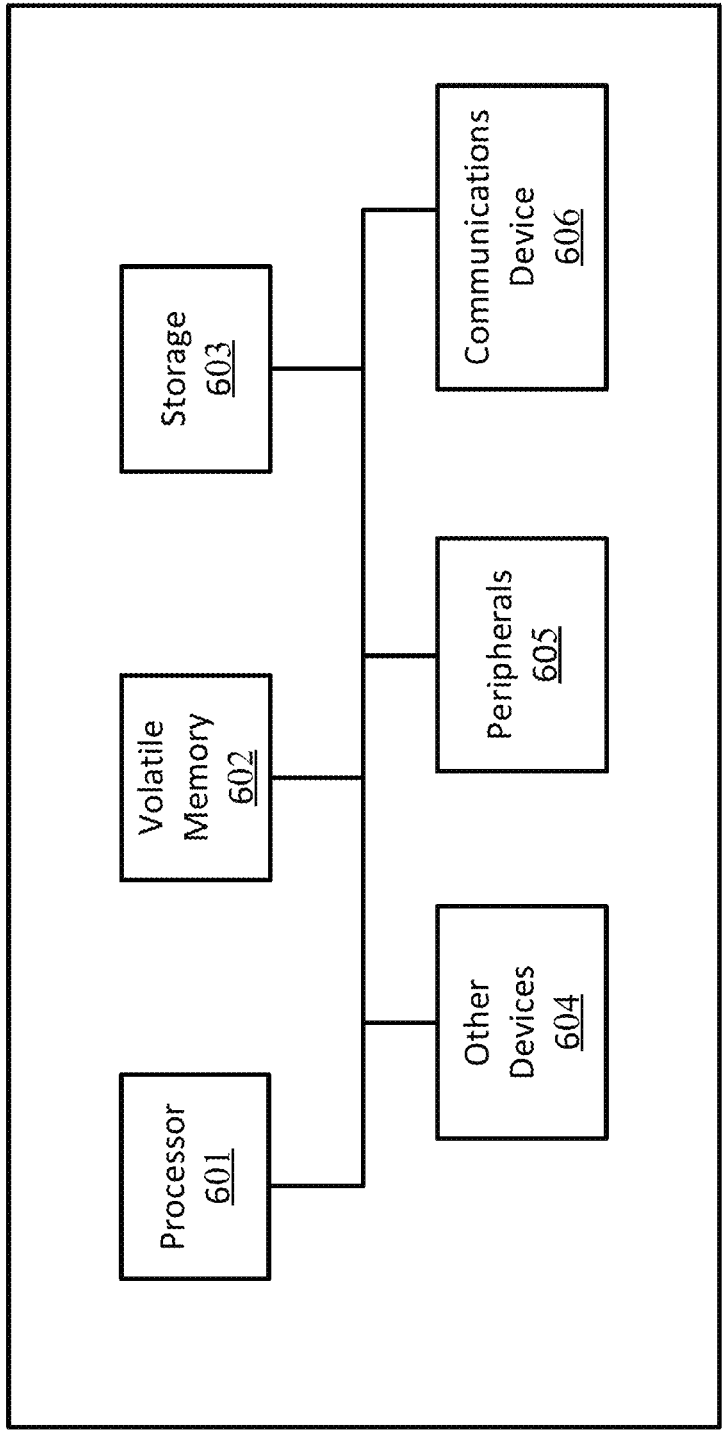
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A communication system comprising one or more processors configured to perform the operations of:
 displaying a communication interface for a communication platform, the communication interface comprising:
  a first input section for receiving input messages associated with a sending user account, and
  a display section for displaying message information received by the sending user account from other user accounts;
 analyzing past activity with respect to sensitive messages of a user associated with the sending user account to determine a sensitive messaging profile for the sending user account, the sensitive messaging profile comprising a set of determined user habits of the sending user account relating to how the user prefers discovery of sensitive information to be handled;
 receiving an input message associated with the sending user account;
 detecting that the input message comprises sensitive information, comprising:
  training one or more artificial intelligence (AI) engines on a labeled dataset comprising a set of sensitive information and a set of non-sensitive information, and
  processing, by the one or more trained AI engines, the input message as it is being received to generate a prediction within a confidence threshold that the input message comprises sensitive information; and based on at least the sensitive messaging profile, transmitting a sensitive message to one or more receiving user accounts within a sensitive container component, wherein the sensitive message comprises at least a subset of the input message, and wherein the sensitive message is accessible upon a receiving user account engaging with the sensitive container component for the duration of an expiration time value.

2. The communication system of claim 1, further configured to perform the operations of:
based on the sensitive messaging profile, transmitting a notification to the sending user account that the sensitive information has been detected within the input message.

3. The communication system of claim 2, wherein the notification comprises a query to the sending user account on whether to proceed with the sensitive message,
wherein transmitting the sensitive message to the receiving user accounts is further based on receiving a query response from the sending user account to proceed with the sensitive message.

4. The communication system of claim 1, further configured to perform the operations of
based on at least the sensitive messaging profile, displaying a sensitive data user interface, the sensitive data user interface comprising:
a second input section for receiving a sensitive message, wherein the second input section is pre-filled with the sensitive information from the input message, and
an interface control for setting the expiration time value for the sensitive message, and
receiving the sensitive message from the sending user account within the second input section.

5. The communication system of claim 1, further configured to perform the operation of:
transmitting, to each of the one or more receiving user accounts, a notification that a sensitive message has been sent, wherein the sensitive message is accessible by the receiving user account for the duration of the expiration time value.

6. The communication system of claim 1, wherein detecting that the input message comprises sensitive information comprises:
determining a similarity match between the input message and one or more sensitive information formats.

7. The communication system of claim 1, wherein the one or more sensitive information formats comprises one or more predetermined formats for personally identifying information (PII), wherein the predetermined formats for PII comprise at least one of a format for social security number, mailing address, phone number, bank account number, full name, passport number, driver's license number, credit card number, and/or email address.

8. The communication system of claim 7, wherein at least a subset of the one or more sensitive user information formats are determined from the sensitive messaging profile.

9. The communication system of claim 1, wherein detecting that the input message comprises sensitive information comprises:
parsing the input message as it is being received for one or more sensitivity indicators.

10. The communication system of claim 9, wherein at least one of the sensitivity indicators is associated with sentiment analysis, emotion analysis, content analysis, text classification, and/or natural language processing.

11. The communication system of claim 9, wherein at least one of the sensitivity indicators is a user-customized sensitivity indicator retrieved from the sensitive messaging profile of the sending user account.

12. The communication system of claim 9, wherein at least one of the sensitivity indicators has been generated by an authorized third party.

13. The communication system of claim 1, further configured to perform the operations of:
retrieving one or more documents associated with the sending user account which comprise one or more confidentiality tags,
wherein detecting that the input message comprises sensitive information comprises determining similarity matches within a confidence threshold of the input message as it is being received to the contents of the one or more documents.

14. The communication system of claim 13, further configured to perform the operations of:
retrieving, from the sensitive messaging profile, one or more user-customized tagging settings relating to the confidentiality tags,
wherein determining the similarity matches of the input message to the contents of the one or more documents is based at least on the user-customized tagging settings.

15. The communication system of claim 1, wherein detecting that the input message comprises sensitive information comprises:
retrieving, from at least the sensitive messaging profile, one or more regular expression (regex) controls relating to sensitive information,
wherein detecting that the input message comprises sensitive information is based at least on the retrieved regex controls.

16. The communication system of claim 1, further configured to perform the operations of:
displaying a detection control user interface, the detection control user interface comprising one or more interface controls for receiving customized settings for the detection of sensitive messages,
wherein detecting that the input message comprises sensitive information is based on at least the received customized settings for the detection of sensitive messages.

17. The communication system of claim 1, wherein transmitting the sensitive message to the one or more receiving user accounts within the sensitive container component comprises:
analyzing the sensitive messaging profile to determine a prediction of an action the sending user account would take with respect to the input message; and
based on the prediction of the action, automatically sending at least a subset of the received input message as a sensitive message to the one or more receiving user accounts.

18. The communication system of claim 1, wherein the sensitive message is automatically deleted upon the duration of the expiration time value lapsing.

19. The communication system of claim 1, wherein the input message associated with the sending user account is received as the input message is being typed into the first input section, and
wherein detecting that the input message comprises sensitive information is performed concurrently to receiving the input message.

20. A method for intelligently detecting a sensitive message within a communication platform, comprising:

displaying a communication interface for a communication platform, the communication interface comprising:

a first input section for receiving input messages associated with a sending user account, and a display section for displaying message information received by the sending user account from other user accounts;

analyzing past activity with respect to sensitive messages of a user associated with the sending user account to determine a sensitive messaging profile for the sending user account, the sensitive messaging profile comprising a set of determined user habits of the sending user account relating to how the user prefers discovery of sensitive information to be handled;

receiving an input message associated with the sending user account;

detecting that the input message comprises sensitive information, comprising:

training one or more artificial intelligence (AI) engines on a labeled dataset comprising a set of sensitive information and a set of non-sensitive information, and processing, by the one or more trained AI engines, the input message as it is being received to generate a prediction within a confidence threshold that the input message comprises sensitive information; and based on at least the sensitive messaging profile, transmitting a sensitive message to one or more receiving user accounts within a sensitive container component, wherein the sensitive message comprises at least a subset of the input message, and wherein the sensitive message is accessible upon a receiving user account engaging with the sensitive container component for the duration of an expiration time value.

\* \* \* \* \*